(12) United States Patent
Duval

(10) Patent No.: US 11,418,353 B2
(45) Date of Patent: Aug. 16, 2022

(54) SECURITY DESCRIPTOR GENERATION

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 122 days.

(21) Appl. No.: 16/551,551

(22) Filed: Aug. 26, 2019

(65) Prior Publication Data

US 2021/0067348 A1 Mar. 4, 2021

(51) Int. Cl.
| | |
|---|---|
| *G05D 1/03* | (2006.01) |
| *H04L 9/32* | (2006.01) |
| *H04L 9/08* | (2006.01) |
| *H04L 9/40* | (2022.01) |

(52) U.S. Cl.
CPC ......... *H04L 9/3268* (2013.01); *H04L 9/0866* (2013.01); *H04L 9/321* (2013.01); *H04L 63/0823* (2013.01)

(58) Field of Classification Search
None
See application file for complete search history.

(56) References Cited

U.S. PATENT DOCUMENTS

| 10,341,321 | B2 * | 7/2019 | Kumar | ................ H04L 63/0823 |
| 2014/0165170 | A1 * | 6/2014 | Dmitriev | ............... H04L 63/168 |
| | | | | 726/7 |

FOREIGN PATENT DOCUMENTS

WO WO-2019030748 A1 * 2/2019 ............. G06F 21/85

\* cited by examiner

*Primary Examiner* — Jeffrey C Pwu
*Assistant Examiner* — Mayasa A. Shaawat
(74) *Attorney, Agent, or Firm* — Holland & Hart LLP

(57) ABSTRACT

Methods, systems, and devices for security descriptor generation are described. An end device may be authenticated based on a certificate and a device key based on a security descriptor. The security descriptor may be generated based on publicly-available information such as time of day information, geographical information, or a default set of information. The security descriptor may be used for generation of a certificate accessible by a server used for authenticating the device and also may be used by an end device to generate a device key for verification by the server authenticating the device.

20 Claims, 7 Drawing Sheets

SECURITY DESCRIPTOR GENERATION

BACKGROUND

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous DRAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

Some devices employed by an end user (e.g., end devices) may go through an authentication process before performing communications with a server (e.g., an Internet server). For example, an end device may be authenticated by the server based on a key associated with the end device and a certificate accessible by the server.

DETAILED DESCRIPTION

Figure 1:
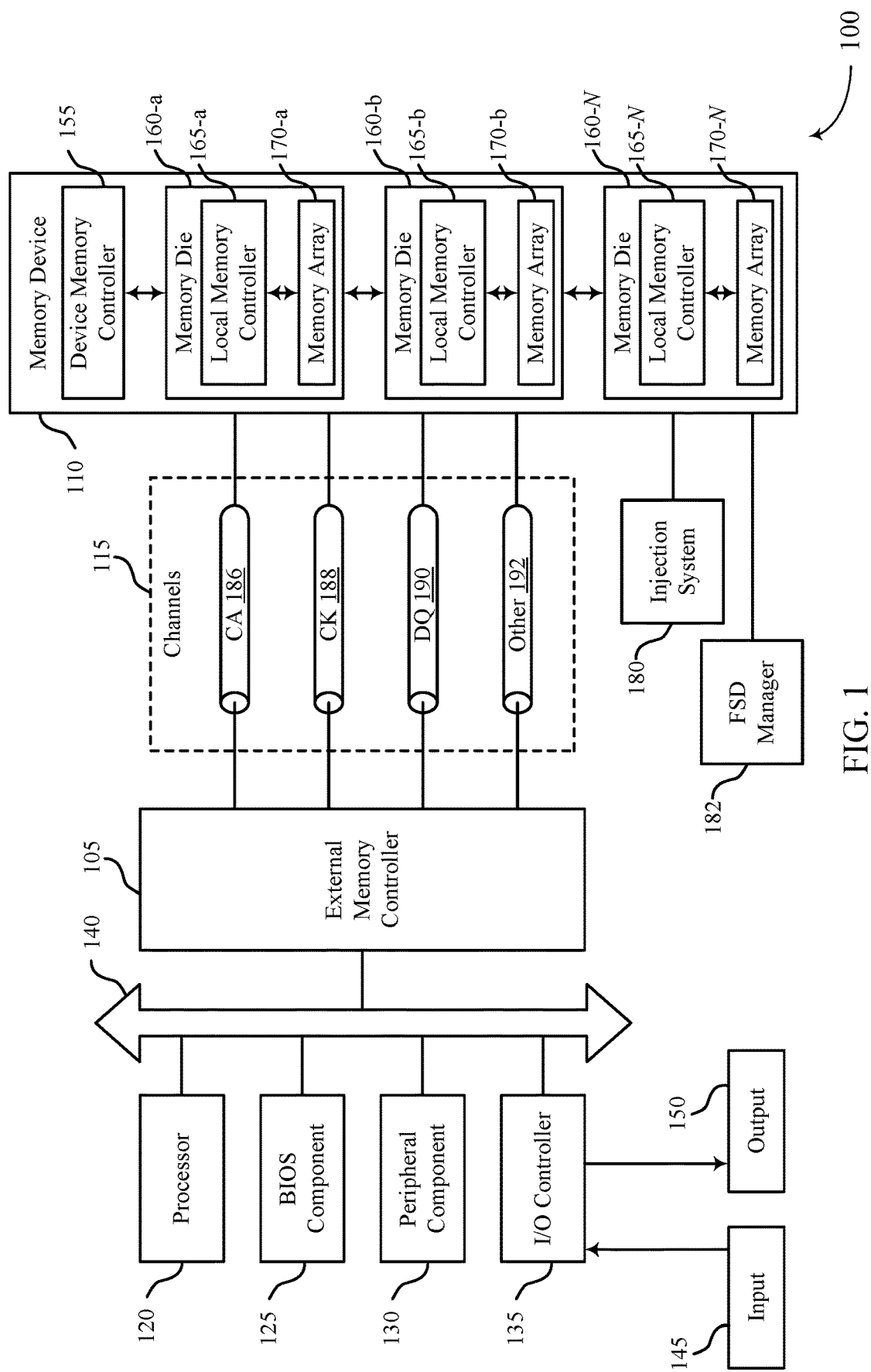
FIG. 1 illustrates an example of a system that supports security descriptor generation in accordance with examples as disclosed herein.

Some devices, such as internet of things (IoT) devices, may be deployed and operated by an end user (e.g., a customer or a client of a manufacturer of the device or components of the device). Such devices may be referred to as end devices. Once deployed, end devices may be authenticated prior to communicating with a server (e.g., an Internet server or other server deployed for use by the end user). For instance, before accessing data at or providing data to the server, an end device may undergo an authentication procedure with the server to ensure that the end device requesting access to the server is a specific device or is a non-malicious device (e.g., an untampered device).

The server may authenticate the end device based on a key (e.g., a device alias key) associated with the end device and a certificate stored at, or otherwise accessible by, the server. For example, a security descriptor (e.g., a firmware security descriptor (FSD)) may be utilized for generation of the certificate and the key associated with the device and in some cases, the security descriptor may be based on source code of a boot loader, such as a second stage boot loader, of the end device (e.g., the security descriptor may be a hash code or function of the second stage boot loader). The second stage boot loader may be specific to the implementation of the end device, and the manufacturer of the end device may not have access to the implementation specific information during the manufacturing or fabrication process of the end device. In scenarios where the manufacturer is to provide a certificate to end users operating a particular end device, information associated with implementation of the end device, information related to the end user, device-specific information, or other information may be directly input by the end user and provided to the manufacturer prior to generating the certificate and the key for authentication. In some deployment scenarios, such as when an end user operates multiple end devices, generating and inputting implementation information, device specific information, or other information for each of the multiple devices may add complexity to the deployment process, may result in deployment delays, or cost increases for a manufacturer of the end device (or components of the end device) or for the end user, among other issues.

According to techniques described herein, an end device may include a memory device used for authentication of the end device. The memory device may be injected with a device-specific secret, such as a unique device identifier, by an injection system. An FSD generator may generate an FSD for authentication, which may be used for generating a memory device alias key (e.g., a private key), and a certificate associated with a public key for the memory device. The FSD generator may utilize data available when the end device first initializes connection (e.g., when the end device first connects to the Internet), such as the time and date, geographical location of the end device, or other information, to generate the FSD. Such data may be referred to as publicly-available data. In some cases the FSD may be used by the end user to generate device alias keys for multiple end devices operated by the end user, where each of the multiple end devices include a respective memory device injected with a different device-specific secret.

A server may authenticate or verify an end device using cryptographic techniques. For example, an end device may sign a data package using a private cryptographic key and send the signed data package to the server. The server may perform one or more authentication processes and confirm that the data package is from a specific electronic device. In some cases, the server may store a public key that is associated with the private key, and using asymmetric cryptographic techniques, may authenticate the data package based on the private key and public key pair.

The authentication techniques described herein may not rely on direct input or information uploaded by the end user about the end device, which may facilitate deployment of multiple end device by the end user. Alternatively, the end user may optionally choose to provide information to the manufacturer and the FSD generator may use this information along with the publicly-available information to generate an FSD.

Features of the disclosure are initially described in the context of a memory system and memory die as described with reference to FIG. 1. Features of the disclosure are described in the context of an authentication process as described with reference to FIG. 2. These and other features of the disclosure are further illustrated by and described with reference to an apparatus diagram and flowcharts that relate to security descriptor generation as described with references to FIGS. 3-6.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100.

At least portions of the system 100 may be examples of a host device, which may be referred to as an end device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package). The memory device 110 may support different types of memory architecture such as NAND, NOR, or both, among others.

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose graphic processing unit (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (e.g., including sixteen signal paths), and so forth. Signals communicated over the channels may use a double data rate (DDR) timing scheme. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

The system 100 may include or support an injection system 180. The injection system 180 may inject the memory device 110 (e.g., by writing to a memory array 170, which may contain non-volatile memory) with a unique identifier or code, which may be referred to as a device specific secret (e.g., a unique device secret (UDS), such as a primary or secondary UDS). The injection system 180 may inject the device specific secret during fabrication or manufacturing of the memory device 110 or components of the memory device 110.

At least some portions of the system 100 may be included in a multimedia controller (MMC), which may include an embedded controller and an embedded memory array. Alternatively, the MMC may be a separate structure and couple with the memory device 110 via one or more conductive paths or be integrated within the MMC. In some cases, the MMC may receive commands from the device memory controller 155 or one or more local memory controllers 165, or may be independent and interface with one or more components (e.g., external memory controller 105, processor 120, I/O controller 135, etc.) using channels 115.

The system 100 may include or support an FSD manager 182. The FSD manager 182 may be accessible by one or more components of the system 100 (e.g., memory device 110) and may obtain a security descriptor such as an FSD for authentication of the memory device 110 or other components of the system 100. The FSD manager 182 may obtain an FSD based on publicly-available information and an FSD stamp may be written to the memory device 110 upon initial booting of the memory device 110. The FSD may be used by the system 100 to generate a device alias key (e.g., a private key of a public-private key pairing) for encryption and the device alias key may be based on the FSD and a device specific secret.

Additionally, or alternatively, at least some portions of the system 100 may be part of or integrated into an IoT device.

The IoT device may be deployed and operated by an end user, and may be referred to as an end device. Some end users may employ multiple end devices, each of which may be authenticated using a certificate accessible by a server, which may indicate public keys for authentication, and the device alias key (e.g., a private key) generated by the FSD and a device specific secret.

In some examples, system 100 may support security techniques such as device identifier composition engine (DICE) or Robust IoT (RIoT). Such security techniques may be cryptographic security techniques and may limit access to the device specific secret by disabling read access to the device specific secret and using a cryptographic key derivation function (e.g., a hash function) that depends on the device specific secret.

Figure 2:
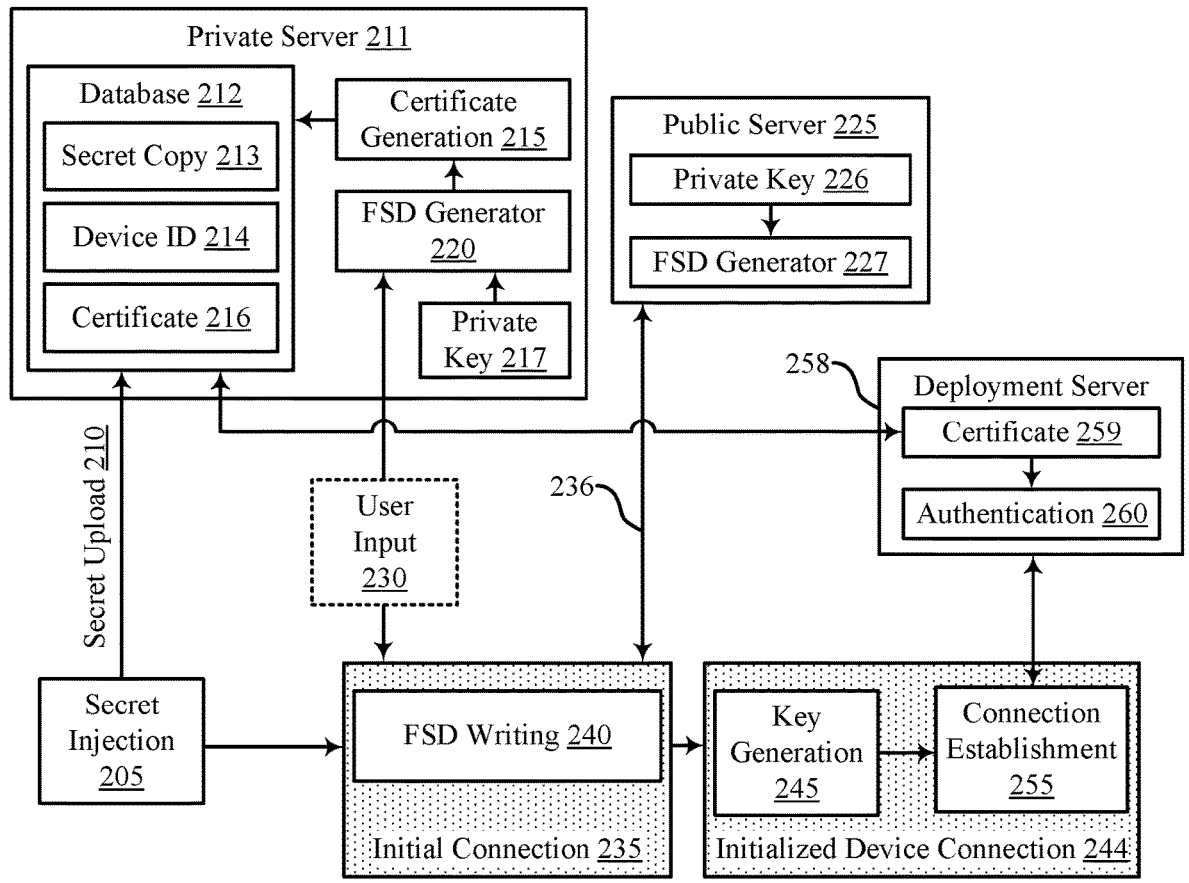
FIG. 2 illustrates an example of an authentication process that supports security descriptor generation in accordance with examples as disclosed herein.

FIG. 2 illustrates an example of an authentication process 200 in accordance with examples as disclosed herein. Authentication process 200 may implement aspects of the system 100 described with reference to FIG. 1. The authentication process 200 may authenticate an end device, which may be an example of one or more portions of the system 100 described with reference to FIG. 1. The end device undergoing the authentication process 200 may include a memory device, which may be an example of the memory device 110 including memory die 160 or memory array 170 described with reference to FIG. 1.

The end device may be an electronic device such as smartphone, tablet, computer, camera or other device that sends and receives data packages to and from other electronic devices. The end device may be an IoT device for automotive technologies such as a sensor on a vehicle in a wireless communications system. The end device may be in IoT device for industrial use such as a smart meter in a commercial or residential environment. The end device may support various memory architectures such as NAND, NOR, or the like. The end device may include an embedded MMC (eMMC) to securely manage data authentication functions. For example, the eMMC may be configured to store one or more cryptographic keys in protected memory partitions. In this regard, the end device may be able to access cryptographic keys, and the eMMC prevents the keys from being removed, replaced or otherwise modified. Accordingly, the embedded structure of the eMMC may provide security features for data transactions occurring between the end device and other electronic devices such as a server accessibly by the end device. In some cases, the end device may employ DICE or RIoT security techniques, and a memory device of the end device may be part of or may implement an SoC device.

At 205, a memory device (or a component for the end device or the end device itself) may be injected with a device specific secret. The device specific secret may be injected by an injection system, such as injection system 180 of FIG. 1, and the injection of the device specific secret may occur during fabrication or manufacturing of the memory device. The device specific secret may be a UDS, such as a primary or secondary UDS, associated with and unique to the memory device. The device specific secret may be written to the memory device (e.g., at a memory array, such as memory array 170 of FIG. 1, which may contain non-volatile memory), and in some cases, may be written to a read-only portion of the memory device. For example, the device specific secret may be written to a portion of the memory device, and after writing, the memory device may disable write-access to that portion of the memory device (e.g., using a latching mechanism). In some cases, read-access to the portion of the memory device storing the device specific secret may also be disabled so as to maintain the secrecy of (e.g., hide) the device specific secret. Once read-access is disabled, a power cycle or system reset may be performed to regain access to the portion of the memory device storing the device specific secret. Using the device specific secret, the memory device may generate an indicator (sometimes referred to as a CDI), which may be a keyed hash function of the device specific secret and a hash of the source code of the memory device at boot up.

Additionally, as the device specific secret is being injected at 205, the same device specific secret is also uploaded at 210 to a private server 211. The upload of the device-specific secret at 210 may include uploading a device ID 214, which may a device ID that is unique to the memory device. The private server 211 may then store a secret copy 213 and the device ID 214. For example, the private server 211 may store the secret copy 213 and the device ID 214 in a database 212.

At 215, a certificate to be used for authenticating the memory device is generated. The certificate may be generated from a security descriptor generated by an FSD generator 220. The generation of the FSD by the FSD generator 220 may depend on one or more of a private key 217 and user input 230. For example, the Device ID 214, which may be included in the secret upload 210, along with a security descriptor (e.g., an FSD) generated by an FSD generator (e.g., FSD manager 182 of FIG. 1) 220, which may be part of or implemented within a key management service (KMS), may be used to generate the certificate at 215. In some examples, the FSD generator at 220 may emulate an FSD generator 227, which is made available at a public server 225. This public server 225 may use a private key 226, which is the same as the private key 217 stored at the private server 211, but may provide a verification of geospatial coordinates, time reference or other publicly-available information of the memory device performing initial connection 235. The private key at 217 and 226 may be used by the FSD generators 220 and 227 the data included in the FSD. The set of publicly-available information to be included by the public server 225 and FSD generator 227 may be listed in an FSD request message 236 coming from the memory device performing its initial connection 235. In some examples, the set of publicly-available information included in the FSD request message 236 may be generated based on input from the end user or another user, such as user input 230. The publicly-available information may include an assessment that the time and date corresponding to when the FSD is generated is within a time window defined by user input 230. For example, if the FSD request 236 includes a time window ending on Jan. 1, 2020, and the public server 225 receives a FSD request message 236 after that date, the public server 225 may send an FSD response 236 indicating an error due to the FSD request message 236 being received after the specified time window. The publicly-available information may also include information associated with the end device (device type, device name, device brand, device make or model number, etc.) or information associated with a user or owner of the end device (user or owner name, company name, company or client information, customer details, location of owner or user, a string of characters associated with the end device, etc.). In some cases, the publicly-available information may include a default set of information used by the FSD generators 220 and 227 (e.g., a default set of parameters for FSD generation).

Information related to the end device or end user may be input by the user at 230, which may be optionally input by the user. For example, the user may select a set of parameters (e.g., a default set, a set related to timing and location of FSD generation, random parameters) with which to generate the FSD by FSD generator 220. The user may input a set of characters, a code, or other information which may be used to generate the FSD by FSD generators 220 and 227. For instance, the user may provide a string representative of a reseller name or an entity of the end device. Other information may also be used to generate the certificate at 215 and once generated, the certificate may be used for authentication at 260 (e.g., the certificate may be sent to a server associated with the end device or user of the end device for authentication).

At 235, upon initial connection of the memory device (or the end device on which the memory device is implemented), the memory device may access an FSD manager (e.g., an FSD manager 182 of FIG. 1) to initiate FSD request and response messages 236. The FSD request and response messages 236 may be used to obtain an FSD for the memory device. For example, the memory device may connect to the public server 225 and request an FSD from the FSD generator 227. The FSD generator 227 may collect data (e.g., based on user input 230, default parameters) and sign the data with its private key 227, thus producing an FSD stamp or other information representative of the FSD. The FSD stamp may then be written at 240 to the memory device. In some cases, the FSD stamp may be written to multiple memory devices, each of which may be associated with a respective end device. Each of the multiple memory devices may have respective device specific secrets, but may use the same FSD stamp representative of the same FSD for key generation at 245.

At subsequent connection events (e.g., attempts of initialized device connection 244 such as attempts to connect to remote servers), the memory device may use the FSD stamp written at 240 to generate a key at 245 for authentication of the end device. For example, the memory device may employ DICE or RIoT key generation techniques (e.g., programs executed by the memory device) that use the FSD stamp written at 240 to generate a device key at 245. In some cases, the device key generated at 245 may be a device Alias key, and may include a public and private Alias key pairing generated using asymmetric key generation techniques. The device key generated at 245 may be based on the indicator (e.g., CDI) generated by the memory device and the FSD indicated by the FSD stamp written at 240.

At 255, the memory device may be deployed and may establish a connection with a deployment server 258 implemented within or supported by an end device operated by an end user (e.g., a customer or client of the memory device). Once in deployment, the end device may undergo an authentication procedure at 260 to gain access to a server associated with the end user or end device. For example, an end device may be authenticated by providing the key generated at 245 to the deployment server 258 performing the authentication of the end device at 260. In some instances, the server may store the certificate 259 generated at 215 (e.g., deployment server 258 may obtain the certificate 216 from the private server 211) or may otherwise have access to the certificate 259, and may use the certificate 259 to authenticate the end device at 260.

According to some aspects, the FSD generation techniques herein may allow for a simplification of the certificate and key generation used for authentication of multiple memory devices. Rather than being based on device specific information, the FSD may be generated based on publicly-available information and optionally provided user input, and may be used for authentication of multiple end devices.

Figure 3:
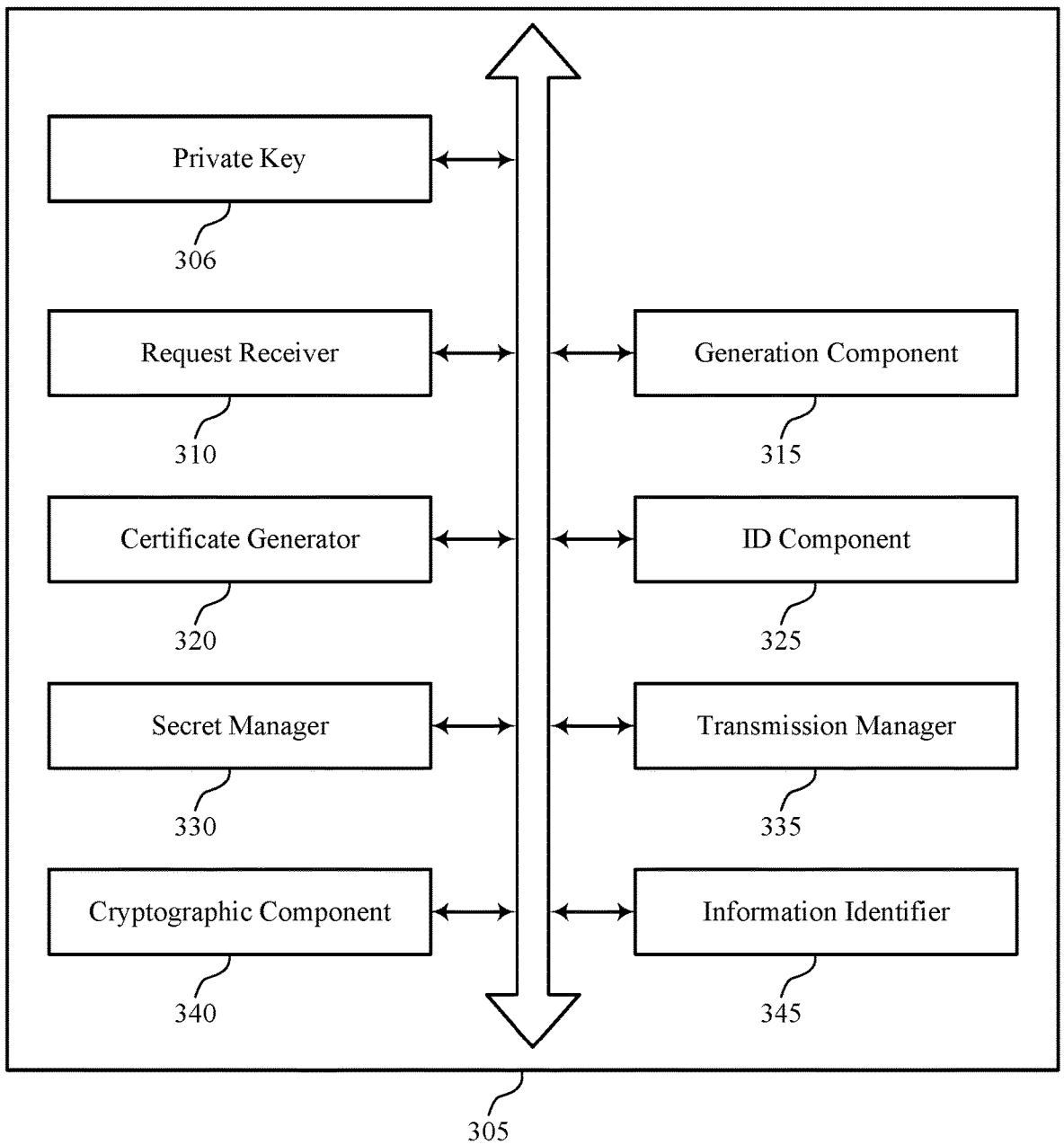
FIG. 3 shows a block diagram of a firmware security descriptor (FSD)-based security system that supports security descriptors in accordance with examples as disclosed herein.

FIG. 3 shows a block diagram 300 of an FSD-based security system 305 that may generate and utilize security descriptors in accordance with examples as disclosed herein. The FSD-based security system 305 may include aspects of an FSD generator as described with reference to FIG. 2. The FSD-based security system 305 may include a private key 306, a request receiver 310, a generation component 315, a certificate generator 320, an ID component 325, a secret manager 330, a transmission manager 335, a cryptographic component 340, and an information identifier 345. Each of these modules may communicate, directly or indirectly, with one another (e.g., via one or more buses).

The request receiver 310 may receive a request for a certificate associated with authentication of an end device. In some cases, the end device is a memory device configured to store data for a host device. In some cases, the end device is an IoT device. In some cases, the request is received from the end device. In some cases, the request is received from the server used for authentication of the end device.

The generation component 315 may generate a FSD based on identifying the publicly-available information, and signing that publicly-available information using a private key 306. In some cases, the FSD is generated independently on a server used for generating certificates used for authentication of the end device.

The certificate generator 320 may generate the certificate based on the FSD and a device-specific secret associated with the end device.

The ID component 325 may determine an ID for the end device based on receiving the request. The ID component 325 may determine the ID, which may be the same as the Device ID 214 as described in FIG. 2.

The secret manager 330 may identify the device specific secret based on an identity of the end device, where generating the certificate is based on identifying the device-specific secret. In some examples, the secret manager 330 may receive the device-specific secret from an injection system configured to inject the device-specific secret in the end device. In some examples, the secret manager 330 may identify the device-specific secret based on receiving the device-specific secret.

The transmission manager 335 may transmit the certificate for authentication of the end device to a server associated with authenticating the end device. In some examples, the transmission manager 335 may transmit the FSD to the end device based on transmitting the certificate to the server. In some examples, the transmission manager 335 may transmit the FSD to the end device based on publicly-available information matching boundaries set in a request from the end device.

The cryptographic component 340 may generate a cryptographic key pair including a public key and a private key based on the FSD and the device-specific secret associated with the end device, where the certificate includes the public key of the cryptographic key pair.

The information identifier 345 may identify publicly-available information based on receiving the request. In some examples, the information identifier 345 may confirm one or more types of publicly-available information to include in the FSD based on information in the request, where identifying the publicly-available information is based on confirming the one or more types of publicly-available information. In some examples, the information identifier 345 may identify a default set of publicly-available information to include in the FSD based on information in the request, where identifying the publicly-available information is based on identifying the default set of publicly-available information. In some cases, the publicly-available information includes a geographical zone associated with the end device, a time stamp associated with activating the end device, information about a user of the end device, information about an owner of the end device, a string of characters associated with an entity of the end device, a default set of parameters, or any combination thereof.

Figure 4:
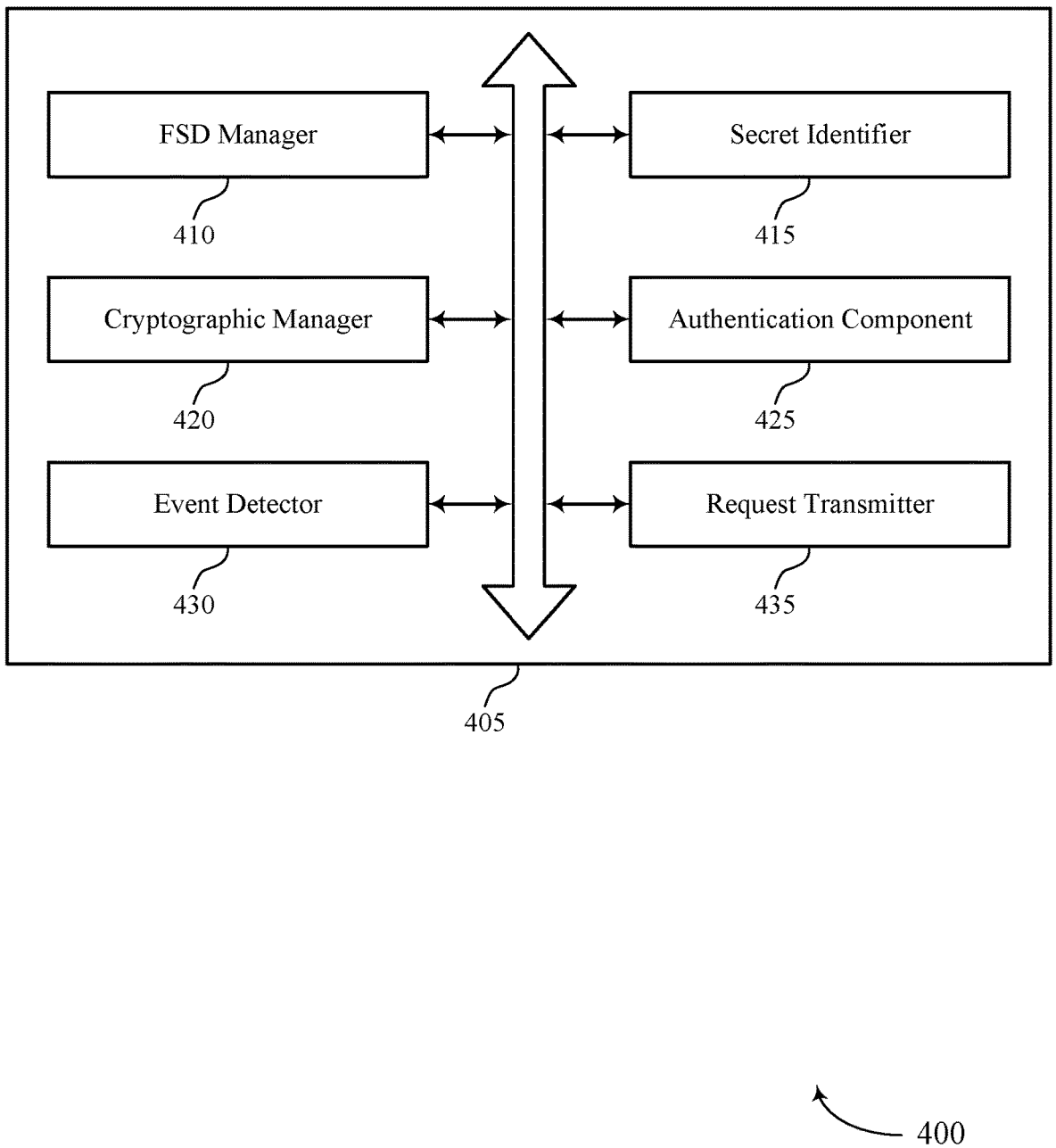
FIG. 4 shows a block diagram of an end device that supports security descriptor generation in accordance with examples as disclosed herein.

FIG. 4 shows a block diagram 400 of an end device 405 that supports security descriptor generation in accordance with examples as disclosed herein. The end device 405 may be an example of aspects of an end device as described with reference to FIGS. 1 and 2. The end device 405 may include an FSD manager 410, a secret identifier 415, a cryptographic manager 420, an authentication component 425, an event detector 430, and a request transmitter 435. Each of these modules may communicate, directly or indirectly, with one another (e.g., via one or more buses).

The FSD manager 410 (e.g., FSD manager 182 of FIG. 1) may receive, by an end device, an FSD. In some examples, the FSD manager 410 may identify publicly-available information, where the FSD contains the publicly-available information.

The secret identifier 415 may identify a device-specific secret stored in a memory of the end device based on receiving the publicly-available information. In some examples, the secret identifier 415 may receive, by the end device, the device-specific secret from an injection system during a manufacturing process of the end device, where identifying the device-specific secret is based on receiving the device-specific secret.

The cryptographic manager 420 may generate a cryptographic key pair including a public key and a private key based on receiving the publicly-available information and identifying the device-specific secret.

The authentication component 425 may authenticate the end device based on the cryptographic key pair.

The event detector 430 may identify a booting event of the end device, where generating the cryptographic key pair is based on identifying the booting event.

The request transmitter 435 may transmit, by the end device, a request for an FSD, where receiving the FSD is based on transmitting the request.

Figure 5:
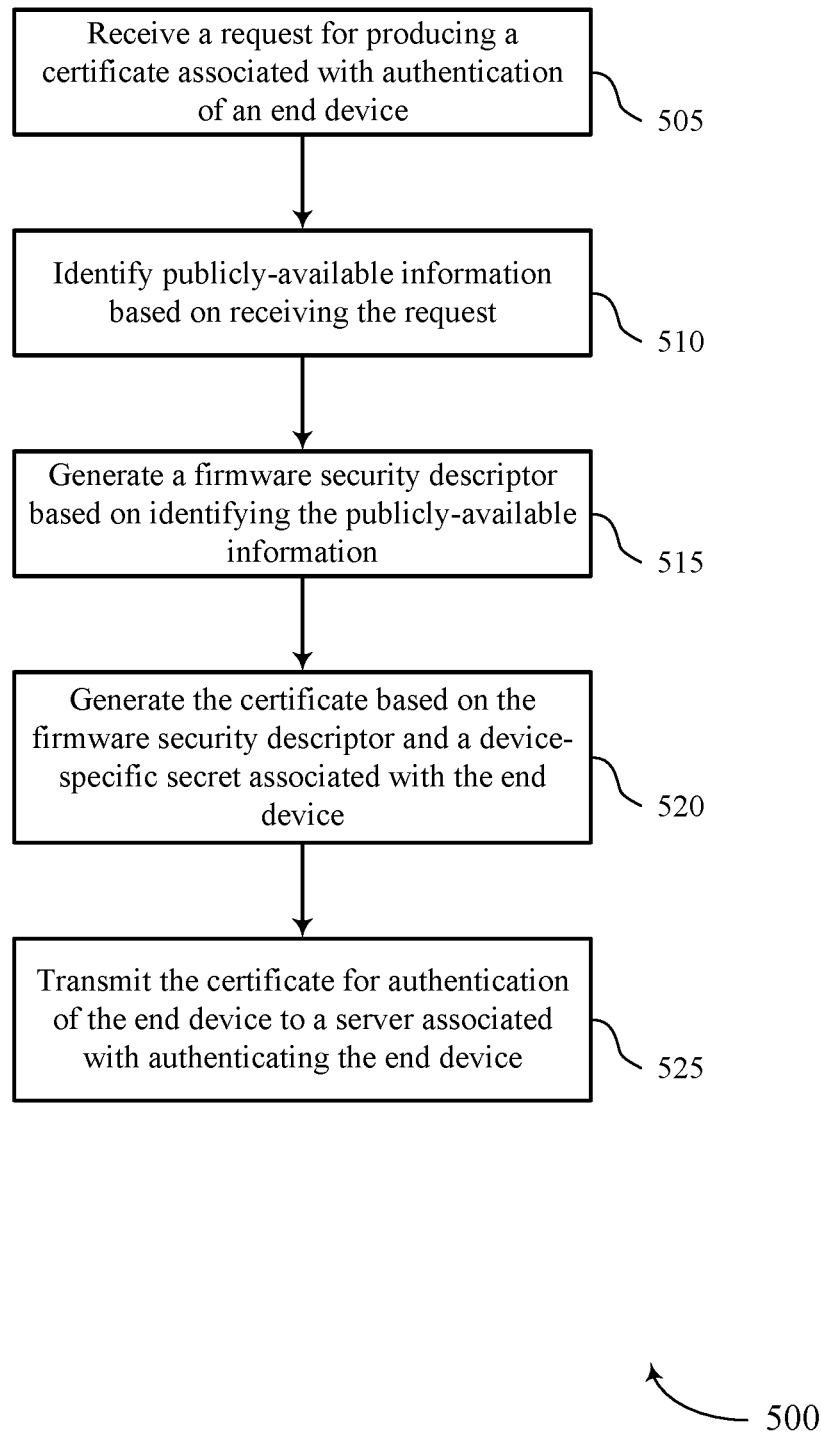
FIGS. 5 through 7 show flowcharts illustrating a method or methods that support security descriptor generation in accordance with examples as disclosed herein.

FIG. 5 shows a flowchart illustrating a method or methods 500 that include security descriptor generation in accordance with examples as disclosed herein. The operations of method 500 may be implemented by an FSD-based security system or its components as described herein. For example, the operations of method 500 may be performed by an FSD-based security system as described with reference to FIG. 3. In some examples, an FSD-based security system may execute a set of instructions to control the functional elements of the FSD-based security system to perform the described functions. Additionally, or alternatively, an FSD-based security system may perform aspects of the described functions using special-purpose hardware.

At 505, the FSD generator may receive a request for producing a certificate associated with authentication of an end device. The operations of 505 may be performed according to the methods described herein. In some examples, aspects of the operations of 505 may be performed by a request receiver as described with reference to FIG. 3.

At 510, the FSD generator may identify publicly-available information based on receiving the request. The operations of 510 may be performed according to the methods described herein. In some examples, aspects of the operations of 510 may be performed by an information identifier as described with reference to FIG. 3.

At 515, the FSD generator may generate a FSD based on identifying the publicly-available information. The operations of 515 may be performed according to the methods described herein. In some examples, aspects of the operations of 515 may be performed by a generation component as described with reference to FIG. 3.

At 520, the FSD generator may generate the certificate based on the FSD and a device-specific secret associated with the end device. The operations of 520 may be performed according to the methods described herein. In some examples, aspects of the operations of 520 may be performed by a certificate generator as described with reference to FIG. 3.

At 525, the FSD generator may transmit the certificate for authentication of the end device to a server associated with authenticating the end device. The operations of 525 may be performed according to the methods described herein. In some examples, aspects of the operations of 525 may be performed by a transmission manager as described with reference to FIG. 3.

In some examples, an apparatus as described herein may perform a method or methods, such as the method 500. The apparatus may include features, means, or instructions (e.g., a non-transitory computer-readable medium storing instructions executable by a processor) for receiving a request for a certificate associated with authentication of an end device, identifying publicly-available information based on receiving the request, generating a FSD based on identifying the publicly-available information, generating the certificate based on the FSD and a device-specific secret associated with the end device, and transmitting the certificate for authentication of the end device to a server associated with authenticating the end device.

Some examples of the method 500 and the apparatus described herein may further include operations, features, means, or instructions for determining an identifier for the end device based on receiving the request, and identifying the device-specific secret based on an identity of the end device, where generating the certificate may be based on identifying the device-specific secret.

Some examples of the method 500 and the apparatus described herein may further include operations, features, means, or instructions for identifying one or more types of publicly-available information to include in the FSD based on information in the request, where identifying the publicly-available information may be based on identifying the one or more types of publicly-available information.

Some examples of the method 500 and the apparatus described herein may further include operations, features, means, or instructions for identifying a default set of publicly-available information to include in the FSD based on information in the request, where identifying the publicly-available information may be based on identifying the default set of publicly-available information.

Some examples of the method 500 and the apparatus described herein may further include operations, features, means, or instructions for transmitting the FSD to the end device based on transmitting the certificate to the server.

Some examples of the method 500 and the apparatus described herein may further include operations, features, means, or instructions for transmitting the identified publicly-available information to the end device based on transmitting the certificate to the server.

Some examples of the method 500 and the apparatus described herein may further include operations, features, means, or instructions for generating a cryptographic key pair including a public key and a private key based on the FSD and the device-specific secret associated with the end device, where the certificate includes the public key of the cryptographic key pair.

Some examples of the method 500 and the apparatus described herein may further include operations, features, means, or instructions for receiving the device-specific secret from an injection system configured to inject the device-specific secret in the end device, where identifying the device-specific secret may be based on receiving the device-specific secret.

In some examples of the method 500 and the apparatus described herein, the publicly-available information includes an assessment that a device was located in a defined geographical zone when it first connected to the public server producing an FSD, an assessment that a device first connected to that public server within a predefined time window, information about a user of the end device, information about an owner of the end device, a string of characters associated with an entity of the end device, a default set of parameters, or any combination thereof.

In some examples of the method 500 and the apparatus described herein, the end device may be a memory device configured to store data for a host device. In some examples of the method 500 and the apparatus described herein, the end device may be an IoT device. In some examples of the method 500 and the apparatus described herein, the request may be received from the end device. In some examples of the method 500 and the apparatus described herein, the request may be received from the server used for authentication of the end device.

Figure 6:
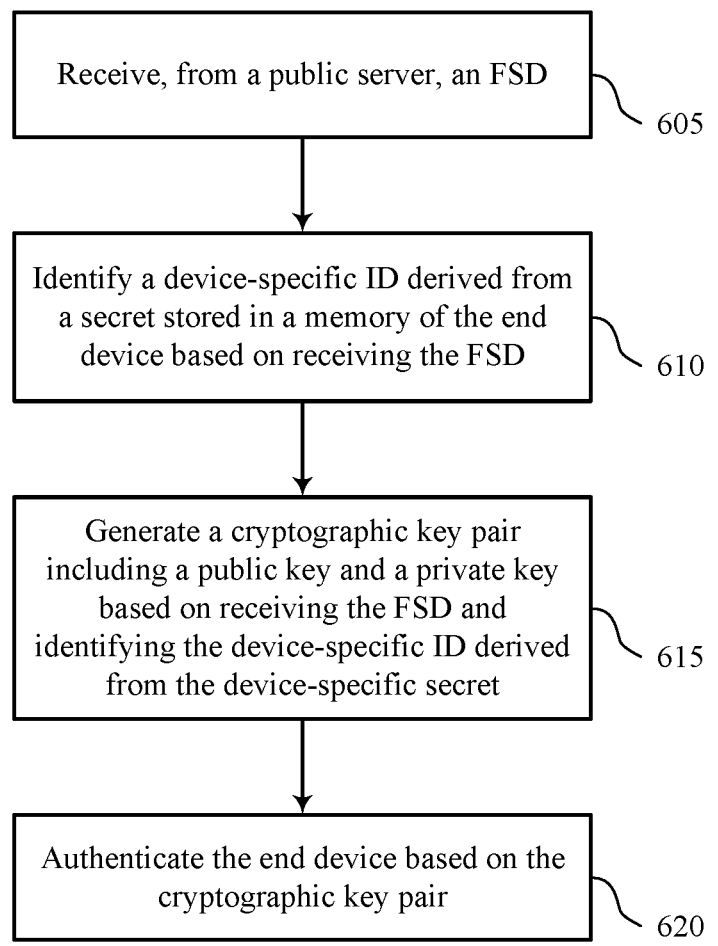

FIG. 6 shows a flowchart illustrating a method or methods 600 that supports cryptographic keys generation in accordance with examples as disclosed herein. The operations of method 600 may be implemented by an end device or its components as described herein. For example, the operations of method 600 may be performed by an end device as described with reference to FIG. 4. In some examples, an end device may execute a set of instructions to control the functional elements of the end device to perform the described functions. Additionally or alternatively, an end device may perform aspects of the described functions using special-purpose hardware.

At 605, the end device may receive, from a public server, an FSD. The operations of 605 may be performed according to the methods described herein. In some examples, aspects of the operations of 605 may be performed by an FSD manager as described with reference to FIGS. 1 and 4.

At 610, the end device may identify a device-specific ID derived from a secret stored in a memory of the end device based on receiving the FSD. The operations of 610 may be performed according to the methods described herein. In some examples, aspects of the operations of 610 may be performed by a secret identifier as described with reference to FIG. 4.

At 615, the end device may generate a cryptographic key pair including a public key and a private key based on receiving the FSD and identifying the device-specific ID derived from the device-specific secret. The operations of 615 may be performed according to the methods described herein. In some examples, aspects of the operations of 615 may be performed by a cryptographic manager as described with reference to FIG. 4.

At 620, the end device may authenticate the end device based on the cryptographic key pair. The operations of 620 may be performed according to the methods described herein. In some examples, aspects of the operations of 620 may be performed by an authentication component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving, by an end device, FSD, obtaining an ID derived from a device-specific secret stored in a memory of the end device based on receiving the FSD, generating a cryptographic key pair including a public key and a private key based on receiving FSD and obtaining the ID derived from the device-specific secret, and authenticating the end device based on the cryptographic key pair.

Some examples of the method 600 and the apparatus described herein may further include operations, features, means, or instructions for identifying a booting event of the end device, where generating the cryptographic key pair may be based on identifying the booting event. For security purposes, the ID based on the device-specific secret may not be available to software running at runtime, and therefore, only boot time software may be capable of generating the cryptographic key pair.

Some examples of the method 600 and the apparatus described herein may further include operations, features, means, or instructions for transmitting, by the end device, a request for the FSD for generation of the cryptographic key pair, where receiving the FSD produced with publicly-available information may be based on transmitting the request.

Some examples of the method 600 and the apparatus described herein may further include operations, features, means, or instructions for receiving, by the end device, the device-specific secret from an injection system during a manufacturing process of the end device, where identifying the device-specific secret may be based on receiving the device-specific secret.

Figure 7:
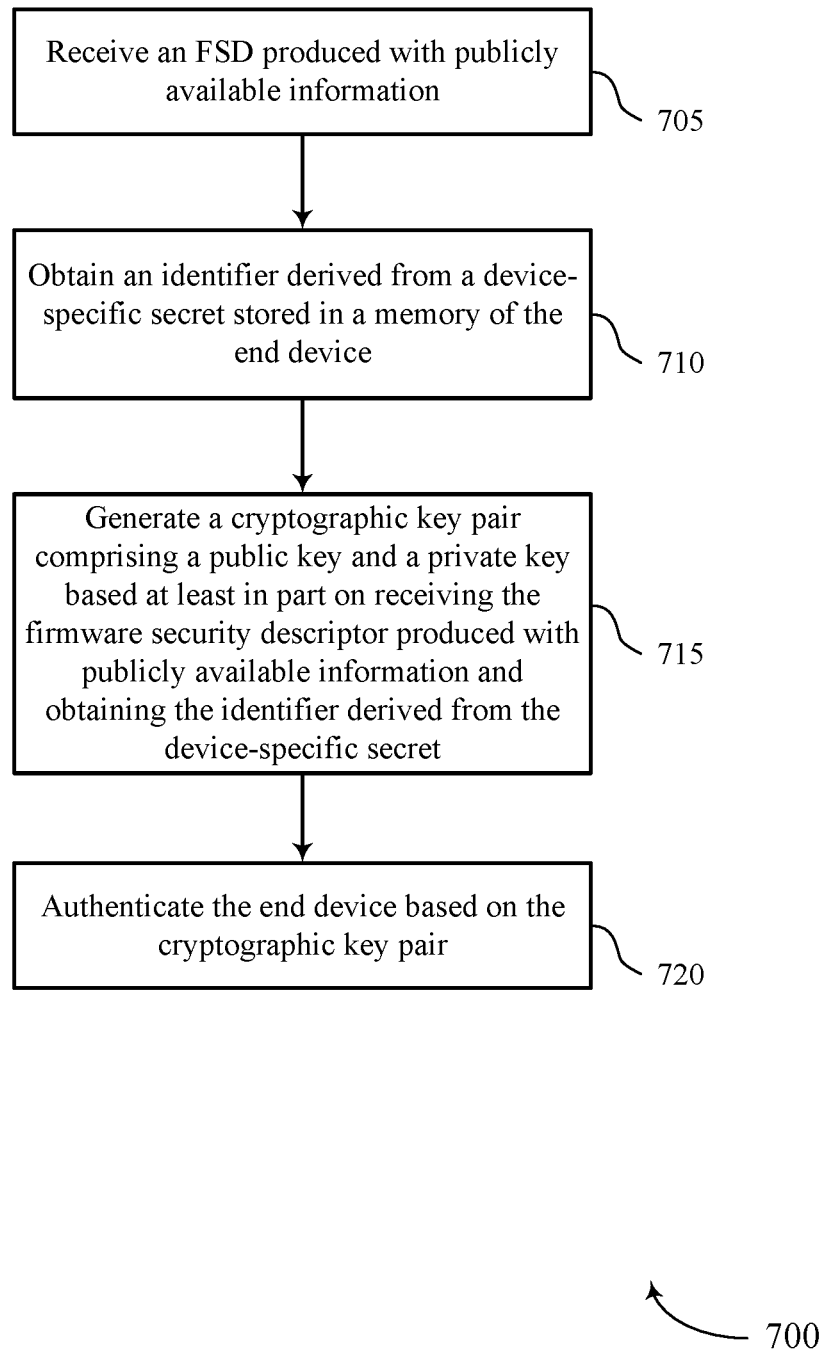

FIG. 7 shows a flowchart illustrating a method or methods 700 that supports cryptographic keys generation in accordance with examples as disclosed herein. The operations of method 700 may be implemented by an end device or its components as described herein. For example, the operations of method 700 may be performed by an end device as described with reference to FIG. 4. In some examples, an end device may execute a set of instructions to control the functional elements of the end device to perform the described functions. Additionally or alternatively, an end device may perform aspects of the described functions using special-purpose hardware.

At 705, the end device may receive an FSD produced with publicly-available information. The operations of 705 may be performed according to the methods described herein. In some examples, aspects of the operations of 705 may be performed by an FSD manager as described with reference to FIGS. 1 and 4.

At 710, the end device may obtain an identifier derived from a device-specific secret stored in a memory of the end device. The operations of 710 may be performed according to the methods described herein. In some examples, aspects of the operations of 710 may be performed by a secret identifier as described with reference to FIG. 4.

At 715, the end device may generate a cryptographic key pair comprising a public key and a private key based at least in part on receiving the firmware security descriptor containing publicly-available information and obtaining an identifier derived from the device-specific secret. The operations of 715 may be performed according to the methods described herein. In some examples, aspects of the operations of 715 may be performed by a cryptographic manager as described with reference to FIG. 4.

At 720, the end device may authenticate the end device based on the cryptographic key pair. The operations of 720 may be performed according to the methods described herein. In some examples, aspects of the operations of 720 may be performed by an authentication component as described with reference to FIG. 4.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
  receiving a request for a certificate associated with authentication of an end device, wherein the end device is a memory device configured to store data for a host device;
  identifying publicly-available information based at least in part on receiving the request, wherein the publicly-available information comprises a geographical zone associated with the end device, a time stamp associated with activating the end device, information about a user of the end device, information about an owner of the end device, a string of characters associated with an entity of the end device, a default set of parameters, or any combination thereof;
  generating a firmware security descriptor based at least in part on identifying the publicly-available information;
  generating the certificate based at least in part on the firmware security descriptor and a device-specific secret associated with the end device; and
  transmitting the certificate for authentication of the end device to a server associated with authenticating the end device.

2. The method of claim 1, further comprising:
  confirming one or more types of publicly-available information to include in the firmware security descriptor based at least in part on information in the request, wherein identifying the publicly-available information is based at least in part on confirming the one or more types of publicly-available information.

3. The method of claim 1, further comprising:
  identifying a default set of publicly-available information to include in the firmware security descriptor based at least in part on information in the request, wherein identifying the publicly-available information is based at least in part on identifying the default set of publicly-available information.

4. The method of claim 1, further comprising:
  transmitting the firmware security descriptor to the end device based at least in part on publicly-available information matching boundaries set in the request from the end device.

5. The method of claim 1, further comprising:
  generating a cryptographic key pair comprising a public key and a private key based at least in part on the firmware security descriptor and the device-specific secret associated with the end device, wherein the certificate includes the public key of the cryptographic key pair.

6. The method of claim 1, further comprising:
receiving the device-specific secret from an injection system configured to inject the device-specific secret in the end device, wherein identifying the device-specific secret is based at least in part on receiving the device-specific secret.

7. The method of claim 1, wherein the request is received from the end device.

8. The method of claim 1, wherein the firmware security descriptor is generated independently on a server used for generating certificates used for authentication of the end device.

9. The method of claim 1, further comprising:
determining an identifier for the end device based at least in part on receiving the request; and
identifying the device-specific secret based at least in part on the identifier for the end device, wherein generating the certificate is based at least in part on identifying the device-specific secret.

10. A method, comprising:
receiving, by an end device, a firmware security descriptor produced with publicly-available information, wherein the end device is a memory device configured to store data for a host device, wherein the publicly-available information comprises a geographical zone associated with the end device, a time stamp associated with activating the end device, information about a user of the end device, information about an owner of the end device, a string of characters associated with an entity of the end device, a default set of parameters, or any combination thereof;
obtaining an identifier derived from a device-specific secret stored in a memory of the end device;
generating a cryptographic key pair comprising a public key and a private key based at least in part on receiving the firmware security descriptor produced with publicly-available information and obtaining the identifier derived from the device-specific secret; and
authenticating the end device based at least in part on the cryptographic key pair.

11. The method of claim 10, further comprising:
identifying the publicly-available information, wherein the firmware security descriptor contains the publicly-available information.

12. The method of claim 10, further comprising:
identifying a booting event of the end device, wherein generating the cryptographic key pair is based at least in part on identifying the booting event.

13. The method of claim 10, further comprising:
transmitting, by the end device, a request for the firmware security descriptor for generation of the cryptographic key pair, wherein receiving the firmware security descriptor produced with publicly-available information is based at least in part on transmitting the request.

14. The method of claim 10, further comprising:
receiving, by the end device, the device-specific secret from an injection system during a manufacturing process of the end device; and
identifying the device-specific secret based at least in part on receiving the device-specific secret.

15. A device, comprising:
a receiver configured to receive a request for a certificate associated with authentication of an end device, wherein the end device is a memory device configured to store data for a host device; and
a firmware security descriptor generator configured to:
identify publicly-available information based at least in part on receiving the request, wherein the publicly-available information comprises a geographical zone associated with the end device, a time stamp associated with activating the end device, information about a user of the end device, information about an owner of the end device, a string of characters associated with an entity of the end device, a default set of parameters, or any combination thereof;
generate a firmware security descriptor based at least in part on identifying the publicly-available information;
generate the certificate based at least in part on the firmware security descriptor and a device-specific secret associated with the end device;
generate a cryptographic key pair comprising a public key and a private key based at least in part on the firmware security descriptor and the device-specific secret associated with the end device, wherein the certificate includes the public key of the cryptographic key pair; and
a transmitter configured to transmit the certificate for authentication of the end device to a server associated with authenticating the end device.

16. The device of claim 15, wherein the firmware security descriptor generator is further configured to:
identify the device-specific secret based at least in part on an identity of the end device, wherein generating the certificate is based at least in part on identifying the device-specific secret.

17. The device of claim 15, wherein the firmware security descriptor generator is further configured to:
identify one or more types of publicly-available information to include in the firmware security descriptor based at least in part on information in the request, wherein identifying the publicly-available information is based at least in part on identifying the one or more types of publicly-available information.

18. The device of claim 15, wherein the firmware security descriptor generator is further configured to:
identify a default set of publicly-available information to include in the firmware security descriptor based at least in part on information in the request, wherein identifying the publicly-available information is based at least in part on identifying the default set of publicly-available information.

19. The device of claim 15, wherein the transmitter is further configured to:
transmit the firmware security descriptor to the end device based at least in part on transmitting the certificate to the server.

20. The device of claim 15, wherein the transmitter is further configured to:
transmit the identified publicly-available information to the end device based at least in part on transmitting the certificate to the server.

* * * * *